Oct. 17, 1967 B. RANKY 3,348,161

VARIABLE RESOLUTION CONSTANT AMPLITUDE FILTER

Filed May 19, 1965

INVENTOR
BELA RANKY

BY Hurwitz & Rose

ATTORNEYS 3,348,161

VARIABLE RESOLUTION CONSTANT AMPLITUDE FILTER

Bela Ranky, Flushing, N.Y., assignor to Analyzer Design, Inc., Flushing, N.Y., a corporation of New York Filed May 19, 1965, Ser. No. 457,130
18 Claims. (Cl. 330—21)

Figure 1:
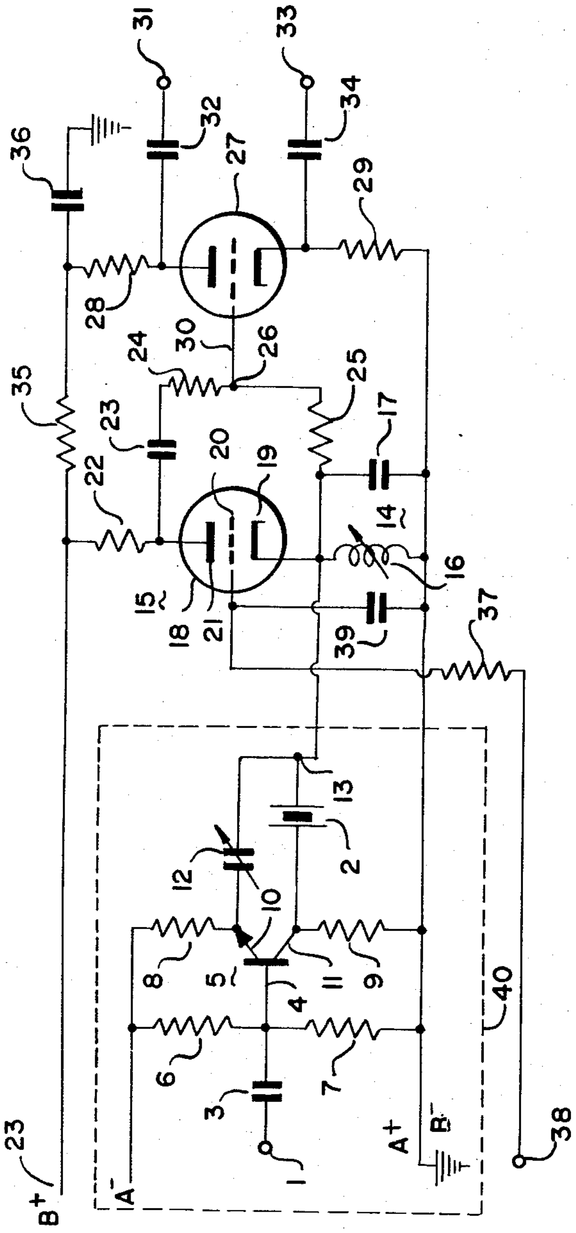

The present invention relates generally to variable bandwidth filters, and more particularly it relates to variable bandwidth filters having means to maintain the output amplitude constant during variation of the bandwidth.

Usual operation of panoramic systems or spectrum analyzers requires that bandwidth be made variable in order that the resolution may be varied. The gain of the system is required to remain constant at any gain setting, despite manipulation of a bandwidth or resolution control device of the system. Bandwidth of a conventional panoramic system is established by the selectivity of a bandpass filter. The bandwidth of a bandpass filter can be varied by varying its loading, but this varies the output amplitude of the filter. It is therefore usual to provide devices, in such receivers, for compensating gain changes in resolution controlling filters which occur concurrently with and as a result of varying bandwidth of the filters. This may readily be accomplished, for example, by ganging a bandwidth and a gain control element of the system, but provision of ganged controls is undesirable.

It is an object and feature of the present invention to provide a completely automatic, inherent, continuous, internal self-compensation of output amplitude of a filter when its bandwith is varied.

Briefly describing the principle of the invention, the output of a filter, the bandwidth of which it is desired to vary, is fed to a voltage variable attenuation circuit with amplification means for amplifying the output of the filter in inverse proportion to the amount of loading of the filter. A specific embodiment of such a device includes a filter and a grounded grid triode amplifier, wherein the grid of the triode is grounded through a source of control voltage and the output of the filter is fed to the cathode of the triode amplifier at a point separated from ground by a tuned cathode impedance. The tuned cathode impedance supplies a first very high impedance path to ground for the output of the filter, and the triode tube, a load resistor, and a power supply, supply a second path to ground for the output of the filter. The control voltage controls the effect of the triode as a resistance element from the signal input point at the cathode of the tube through the load resistance and the power to ground to provide loading on the filter. It is a basic characteristic of a "grounded" grid triode wherein the grid is "grounded" through a voltage source, that the amplification factor of the tube can be varied by varying the voltage applied to the grid. In the embodiment of the invention under discussion, a variable control voltage controls both the amplification factor of the tube and the amount of quiescent conduction, with consequent loading of the filter, provided by the tube. In the particular circuit arrangement wherein the output of the filter is fed to the cathode of the triode tube, increased loading of the filter occurs when the grid is made more positive, and the control of cathode voltage over tube current is increased when the grid is made more positive. Thus, an increase in loading of the filter increases the gain of the tube and the effect of decreasing the amplitude of the output of the filter by the increased loading of the filter is compensated for by increasing amplification of the filter output in inverse relation to the loading of the filter. The output amplitude is thus constant.

It should be further noted that when the triode is non-conducting and theoretically no loading of the filter exists, that the output of the triode is taken directly from the input to the triode at the cathode electrode. When there is some loading and some amplification an output is taken from the cathode of the triode and from the plate of the triode. Because the output at the plate is in phase with the input at the cathode in a grounded grid amplifier configuration, the two outputs can be combined in a summing network to provide a single output signal of constant amplitude.

It is, accordingly, a broad object of the present invention to provide a novel system of concurrent bandwidth and gain control for filters and bandpass amplifiers.

It is another object of the invention to provide a system of concurrent and inherent bandwidth control and gain compensation for filters and amplifiers.

It is a further object of the invention to provide a system of concurrent gain and bandwidth adjustment for bandpass filters and amplifiers, the latter having thereby a constant gain for a wide range of bandwidth adjustments.

It is still another object of the present invention to provide a bandwidth control, consisting of means for variably loading a filter and means for amplifying the output of the filter in inverse proportion to the amount of loading of the filter, whereby the output of the filter remains constant regardless of the amount of loading of the filter.

A further object of the invention is to provide a bandwidth control, consisting of means for variably loading a filter to vary the bandpass characteristics of the filter and for amplifying the output of the filter in inverse proportion to the amount of loading of the filter, whereby the output of the filter remains constant regardless of the amount of loading of the filter.

Another object of the invention is to provide a bandwidth control, consisting of tube or transistor means controlled by a control voltage for shunting a filter to ground and for amplifying the output of the filter in inverse proportion to the degree of shunting.

Figure 2:
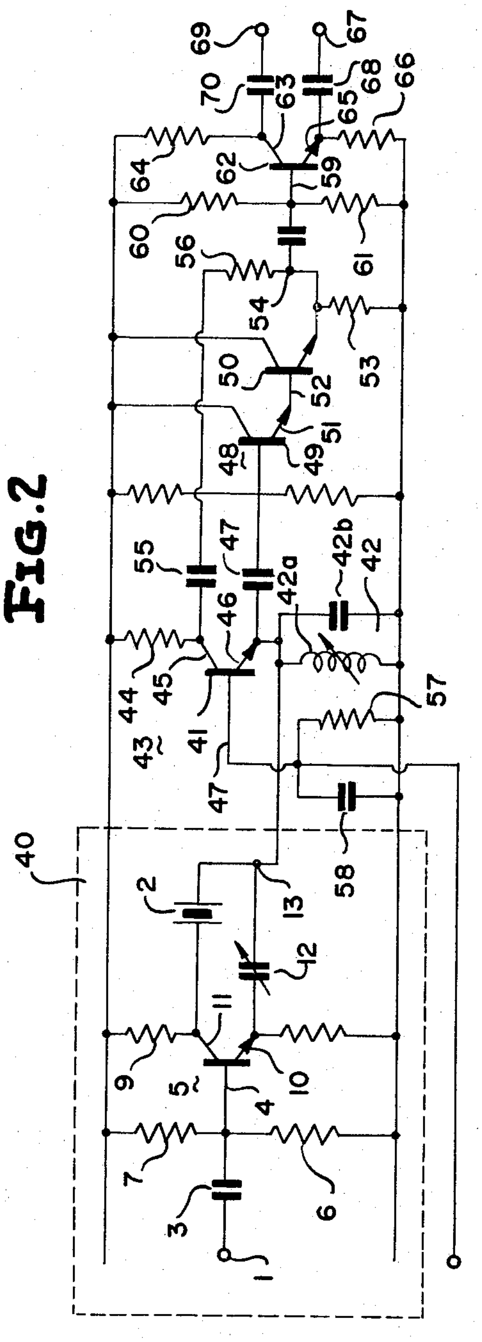

The above and still further objects, features and advantages of the present invention will become apparent upon consideration of the following detailed description of one specific embodiment thereof, especially when taken in conjunction with the accompanying drawings, wherein:

FIGURE 1 is a schematic circuit diagram of a filter system having variable bandwidth and constant amplitude characteristics according to the present invention; and FIGURE 2 is a schematic circuit diagram of a fully transistorized version of the system of FIGURE 1.

Referring now to FIGURE 1 of the accompanying drawings, the reference numeral 1 denotes a signal input terminal to which an A.C. signal or an A.C. complex signal may be applied containing signal frequency of the piezoelectric crystal filter 2. In an exemplary application of the present invention the terminal 1 may represent an interstage coupling of an I.F. amplifier, a heterodyne mixer output terminal, or the like. Terminal 1 is coupled by means of a coupling capacitor 3 to the base electrode 4 of transistor 5. Resistors 6 and 7 provide a bias voltage for the base electrode of transistor 5. Resistor 8 and resistor 9 are load resistors coupled between a power supply and the emitter electrode 10 of transistor 5 and the collector electrode 11 and ground respectively. Transistor 5 serves as an amplifier and a phase splitter providing a first signal taken from the junction of the collector electrode 11 and the load resistor 9 for the input to a crystal filter 2 and a second signal taken from the junction of the emitter electrode 10 and the load resistor 8 in phase opposition to the first signal. The first signal is applied to a first terminal of crystal filter 2 and the second signal is fed to the other terminal of the filter 2 through a trimmer capacitor 12 providing a neutralization signal to the crystal filter load point 13.

Piezoelectric crystal filter 2 is exemplary of a variety of crystal filters or of filters which do not employ piezoelectric crystals, but which is of such nature that its response bandwidth may be varied by varying its loading.

The output of filter 2 is applied to a variable load capable of amplifying the output of the crystal filter in inverse proportion to the loading of the filter. The output of the filter 2 is applied across two shunt circuits 14 and 15 in parallel. The first shunt circuit 14 is a resonant circuit composed of a variable inductance 16 and a capacitor 17. The second shunt circuit 15 includes a triode tube 18 having a cathode 19, a grid 20, and a plate 21, a load resistor 22, and a power supply 23 in series. Shunt circuit 14 has a fixed impedance and is resonant at the same frequency as the filter 2, thus presenting a very high impedance to a signal within the resonant frequency range of the filter and a relatively low impedance to a signal outside the frequency range of the filter 2. Shunt circuit 15 has a variable impedance controlled by the voltage impressed on the grid 20 making it possible to control the loading of the filter 2 by controlling the voltage on grid 20 and the consequent tendency of shunt circuit 15 to ground the output of the filter 2.

The combination of the shunt circuit 14 and the shunt circuit 15 comprises an amplifier circuit having a grounded grid configuration. The output of the filter is connected to the cathode of triode tube 18 and controls the voltage of the cathode to control the flow of current through the tube. Grid voltage of the tube 18 is controlled from some remote point by varying a voltage source between the grid 20 and ground, and by control of the grid voltage the gain of the tube is controlled. The input signal at the cathode 19 is in phase with the output signal at the plate 21. An amplified output signal is available at the plate 21 of the tube 18 and may be combined in an adding circuit composed of capacitor 23, resistor 24 and resistor 25 with the input signal applied at the cathode 19 to form a single output signal of constant amplitude.

Normal operation of grounded grid configuration amplifiers requires that the input signal be applied at the cathode and isolated from ground by means of an impedance element. However, if the cathode-to-ground resistance is great the amplifier will not be effective, resulting in the requirement for a low value cathode-to-ground resistor producing an amplifier with low input impedance. The use of a tuned circuit for the cathode-to-ground resistance allows the use of a grounded grid amplifier configuration having high input impedance within the frequency range of the tuned circuit. It might seem at first that the tuned shunt circuit 14 could be simply eliminated and the requirement for high cathode-to-ground resistance would be satisfied. There is, however, the additional requirement that the tube 18 be able to conduct an A.C. current. There must be a quiescent D.C. current through the tube 18 upon which an A.C. signal can be superimposed. For such to be possible, it is necessary that the tuned shunt circuit 14 have a relatively low D.C. impedance. A triode can be considered as a diode whose conductance is controllable by the grid voltage. Because the grounded grid amplifier configuration has its input terminal at one of the "diode" electrodes of the tube, the grid can be used to control the conductance of the tube as well as the amplification factor of the tube.

The problem which the present invention solves is that of loading a filter and yet maintaining its output constant under all conditions. The filter 2 is connected to one of the "diode" electrodes or terminals of the tube 18. By varying the conductance of the tube 18 by controlling the grid voltage, the filter 2 output may be shunted through tube 18. Variation of the grid voltage to load the filter 2 also increases the amplification factor of the tube 18 so that as the output of the filter 2 is attenuated by loading, it is also amplified to compensate for attenuation due to loading.

When the resistance of tube 18 is high and it is not conducting, the signal from the filter 2 is not attenuated by either of the shunt circuits 14 or 15 and passes to the output circuit through summing resistance 25. When the tube 18 is shunting the output of filter 2 to ground, the output of the filter is also amplified by tube 18 with the amplified output appearing at the plate 21. The amplified output of amplifier tube 18 passes through summing resistor 24 to be summed with the unamplified signal passing through summing resistor 25 resulting in a constant output signal.

The summed output of amplifier tube 18 and the output signal of the filter 2 is tapped from the junction 26 of summing resistors 24 and 25 and fed to the grid 30 of a standard triode amplifier tube 27 having a plate load resistor 28 and a cathode load resistor 29. Output leads are provided for obtaining signals from across the plate load resistor 28 and from across the cathode load resistor 29, wherein the signals so obtained are 180 degrees out-of-phase. The amplified signal from the plate of tube 27 feeds terminal 31 through a capacitance 32. The signal developed at the cathode of tube 27 feeds terminal 33 through capacitance 34. Output terminal 33 is a low impedance output with moderate gain and is preferred when more than one crystal filter is used in the network. Output terminal 31 is a high impedance output with considerable gain and is preferentially used in a final filter stage. Plate load resistor 28 may include resistor 35, the junction point of which is shunted to ground by a decoupling capacitor 36 to prevent A.C. signals from being injected into the power supply.

The triode tube 18 is parallel to the tuned shunt circuit 14 which represents the cathode impedance for the triode tube 18. As long as the tube is not conducting, there is no load for filter 2. When the tube 18 is conducting, a D.C. current flows through inductance 16, triode tube 18, and load resistor 22, lowering the impedance of the circuit presented by triode tube 18, load resistor 22, and the power supply, producing a load for the filter 2, which changes its bandwidth from broad to narrow. The conductivity of tube 18 is controlled by its grid voltage which is connected through a resistance 37 to the remote control input terminal 38. Varying the remote control voltage at input terminal 38 from 0 volts to −5 volts brings the triode tube 18 from conducting to full cut-off position. Capacitance 39 serves as a bypass capacitor for A.C. signals. When the tube 18 is conducting, the junction of plate 21 and plate load resistance 22 develops an amplified A.C. signal which feeds to the next amplifier tube 27 through capacitance 23 and resistance 24. When the triode tube 18 is rendered non-conducting by setting the grid voltage beyond cut-off, the output signal from the filter is not appreciably affected by either the tuned shunt circuit 14 or the shunt circuit comprising the triode tube 18, the load resistor 22, and the power supply and the output signal from filter 2 is available to feed the next amplifier tube 27 through resistance 25. The remotely controlled triode tube 18 operating as a grounded grid-type amplifier serves two purposes: First, it controls the resolution of filter 2. Second, it serves to amplify the output of the filter in inverse proportion to the signal attenuation, thus providing a constant amplitude output signal from the filter. When the crystal load is high, the signal amplitude on the crystal decreases, but in this condition the tube serves as an amplifier and restores the filter output signal strength to the same value it had in the no-load condition. Resistance 25 between the cathode 19 of tube 18 and the grid of tube 27 serves as pass circuit in the no-load condition of the remote controlled tube 18.

The system of FIGURE 2 is a transistorized version of FIGURE 1 with an input amplifier stage and filter arrangement 40 identical to the input amplifier stage and filter arrangement in FIGURE 1. The circuit for loading the filter and amplifying the filter output signal in inverse proportion to the amount of attenuation is essentially the same as the analogous circuit in FIGURE 1, except a transistor 41 has been substituted for the triode tube 18. Tuned shunt circuit 42 containing inductance 42a and capacitor 42b provide a very high emitter impedance at the resonant frequency of the filter 2 and a low impedance to D.C. current to provide an acceptable quiescent operating point for transistor 41. The variable shunt circuit 43 including transistor 41, load resistor 44 and the power supply provides a shunt path to ground in parallel with the tuned shunt circuit 42. Transistor 41 has a collector 45 connected to load resistor 43 and an emitter 46 connected to the tuned shunt circuit 42. The base 47 of transistor 41 is grounded through a remote control voltage source for controlling the gain of the transistor by varying the base bias. In a manner similar to that utilized in the apparatus of FIGURE 1, the value of the base bias controls the conductivity of the transistor 41, to cause the variable resistance of the transistor 41 to be effective in loading the filter 2, as well as controlling the amount of gain that the transistor will provide in amplifying the output of the filter 2 when the filter is loaded.

When the base 47 of transistor 41 is made positive, the transistor becomes conductive causing an output of filter 2 to be shunted, in a limited sense, to ground. Making the base positive also increases the amplification factor of the transistor in inverse proportion to the amount of loading caused by the increased conductivity of the transistor. The output of filter 2 is available in attenuated form at the junction of emitter 46 and the tuned shunt circuit 42, and in amplified form at the junction of collector 45 and load resistor 44. The attenuated signal taken from the emitter 46 is fed through coupling capacitor 47 to a plural stage transistor amplifier 48 including transistors 49 and 50. The arrangement of this transistor amplifier, wherein the emitter 51 of the first transistor 49 is connected directly to the base 52 of the second transistor 50 and an output is taken across an emitter load resistor 53, is known as a Darlington-circuit, and is characterized by high input impedance, serving to couple the output of the filter 2 to the summing point 54 without presenting an unwanted load to the filter. The amplified signal taken from the collector 45 is fed through capacitor 55 and summing resistor 56 to the summing point 54. By adding the attenuated filter output signal to the amplified filter output signal which has been amplified in inverse proportion to the amount of attenuation, it is possible to maintain the output of the filter constant in amplitude. When the base bias of transistor 41 is negative and the transistor is biased into its cut-off region, no current can flow through the transistor 41 and the filter 2 is not partially shunted to ground by either the tuned shunt circuit 42 or the shunt circuit that includes transistor 41. The output signal from filter 2 is not attenuated and the filter is not loaded. No amplified A.C. signal appears at the collector 45. The output of filter 2 communicates with transistor amplifier 48, which has a high input impedance to prevent loading of the filter, and is applied to the summing point without attenuation. Resistance 57 across the base bias control line of transistor 41 serves to bring negative cut-off voltage to the base 47 in absence of positive remote voltage, and capacitor 58 bypasses A.C. current to ground.

The constant amplitude signal developed at summing terminal 54 is applied to the base 59 biased by means of a voltage divider consisting of resistors 60 and 61 of a transistor amplifier 62. Transistor 62 includes a collector 63 connected to a collector load resistor 64 and an emitter 65 connected to an emitter load resistor 66. The amplified signal from the emitter 65 of transistor 62 feeds terminal 67 through a capacitance 68. The signal developed at the collector 63 of the transistor 62 feeds terminal 69 through a capacitor 70. Output terminal 67 is a low impedance output with moderate gain, and output terminal 69 is a high impedance output with substantial gain.

The remotely controlled transistor 41 operating as a grounded base amplifier serves two purposes: First, it controls the resolution of filter 2 by changing its response characteristics through loading. Second, it amplifies the output of the filter 2 in inverse proportion to the amount of attenuation of the output of filter by any increase in conductance of transistor 41.

While I have described and illustrated one specific embodiment of the present invention, it will become apparent that variations of the specific details of construction may be resorted to without departing from the true spirit and scope of the invention as defined in the appended claims.

I claim:

1. A system for varying the selectivity of a bandpass filter system while maintaining gain of the filter system substantially constant, comprising
   - a bandpass passive filter having an input circuit and an output circuit,
   - an amplifier device having a control electrode and a charge source electrode and a charge collector electrode,
   - a tank circuit connected between said output circuit and a point of reference potential, said tank circuit being tuned to a frequency within the passband of said passive filter,
   - means connecting said output circuit to said charge source electrode,
   - a load impedance connected in series with said charge collector electrode,
   - means for applying a variable control potential to said control electrode, said amplifier device having internal resistance and gain variable in opposite senses in response to variations in said control potential, and
   - means for additively combining signals at said charge collector electrode and at said charge source electrode to provide an output signal for said bandpass filter system whereby said changes in gain tend to compensate the amplitude of said output signal for changes of loading due to said changes in internal resistance, and said changes in internal resistance vary the selectivity of said bandpass passive filter.

2. The combination of claim 1 wherein the amplifying means is an electronic tube and the passive filter is a piezoelectric crystal.

3. The combination of claim 1 wherein the amplifying means is a transistor and the passive filter is a piezoelectric crystal.

4. A variable-bandwidth, constant-amplitude bandpass filter arrangement comprising
   - a bandpass filter having an input and an output,
   - means for introducing signals into said filter input,
   - amplifying means having a first terminal and a second terminal,
   - means for controlling the current flow from the first terminal to the second terminal,
   - parallel tuned circuit means resonant in the bandpass frequency range of the filter coupling the first terminal to ground,
   - means including a load resistor coupling the second terminal to ground,
   - variable control voltage means coupled to said means for controlling to control the current flow from the first terminal to the second terminal and to control the gain of the amplification means,
   - means coupling the bandpass filter output to the first terminal, and
   - means for additively combining the outputs from the first terminal and the second terminal.

5. A variable-bandwidth, constant-amplitude bandpass filter arrangement comprising
   - a bandpass filter having an input and an output,
   - means for introducing signals into said filter input,
   - amplifying means having a first terminal and a second terminal, means for controlling the internal resistance and the gain of the amplifying means wherein the internal resistance of the amplifying means decreases in proportion to the increase in the amplification factor of the amplification means,
parallel tuned circuit means resonant in the bandpass frequency range of the filter coupling the first terminal to ground,
means including a load resistor coupling the second terminal to ground,
variable control voltage means coupled to said means for controlling to control the internal resistance and the gain of the amplifying means,
means coupling the bandpass filter output to the first terminal, and
means for additively combining the outputs from the first terminal and the second terminal.

6. The combination of claim 5 wherein the amplifying means is a transistor, the first terminal is an emitter electrode, the second terminal is a collector electrode, and the means for controlling is a base electrode, and wherein the filter is a piezoelectric crystal.

7. The combination of claim 5 wherein the amplifying means is an electronic tube, the first terminal is a cathode, the second terminal is a plate, and the means for controlling is a grid, and wherein the filter is a piezoelectric crystal.

8. A variable-bandwidth, constant-amplitude bandpass filter arrangement comprising
a bandpass filter having an input and an output,
means for introducing signals into said filter input,
amplifying means having a first terminal and a second terminal,
means for controlling the current flow from the first terminal to the second terminal,
parallel tuned circuit means resonant in the bandpass frequency range of the filter coupling the first terminal to ground,
means including a load resistor coupling the second terminal to ground,
variable control voltage means coupled to said means for controlling to control the current flow from the first terminal to the second terminal and to control the gain of the amplification means,
means coupling the bandpass filter output to the first terminal, said amplifying means serving to attenuate the signal applied to its first terminal by shunting the signal to ground and to amplify the signal in inverse proportion to the amount the signal is attenuated, said amplified signal appearing at the second terminal of the amplifying means, and
means for additively combining the outputs from the first terminal and the second terminal, whereby varying the variable voltage control means controls the conductance of the amplifying means and the gain of the amplification means to attenuate the output of the filter in inverse proportion to the amount the output of the filter is amplified providing a summed output signal having components of the attenuated signal and the amplified signal which is always constant in amplitude.

9. The combination of claim 8 wherein the amplifying means is a transitsor, the first terminal is an emitter electrode, the second terminal is a collector electrode, and the means for controlling is a base electrode.

10. The combination of claim 8 wherein the amplifying means is an electronic tube, the first terminal is a cathode, the second terminal is a plate, and the means for controlling is a grid.

11. A variable-bandwidth, constant-amplitude bandpass filter arrangement comprising,
a bandpass filter having an input and an output,
means for introducing signals into said filter input,
amplifying means having a first terminal and a second terminal, means for controlling the current flow from the first terminal to the second terminal, said amplifying means serving to attenuate the signal applied to its first terminal by shunting the signal to ground and to amplify the signal in inverse relationship to the attenuation of the signal, said amplified signal appearing at the second terminal of the amplifying means,
parallel tuned circuit means resonant in the bandpass frequency range of the filter coupling the first terminal to ground,
means including a load resistor coupling the second terminal to ground,
variable control voltage means coupled to said means for controlling to control the current flow from the first terminal to the second terminal and to control the gain of the amplification means,
means coupling the bandpass filter output to the first terminal, and
means for additively combining the outputs from the first terminal and the second terminal.

12. The combination of claim 11 wherein the amplifying means is a transistor, the first terminal is an emitter electrode, the second terminal is a collector electrode, and the means for controlling is a base electrode.

13. The combination of claim 11 wherein the amplifying means is an electronic tube, the first terminal is a cathode, the second terminal is a plate, and the means for controlling is a grid.

14. A variable-bandwidth, constant-amplitude bandpass filter arrangement comprising
a bandpass filter having an input and an output,
means for introducing signals into said filter input,
amplifying means having a first terminal and a second terminal,
means for controlling the current flow from the first terminal to the second terminal,
parallel tuned circuit means resonant in the bandpass frequency range of the filter coupling the first terminal to ground,
means including a load resistor coupling the second terminal to ground,
variable control voltage means coupled to said means for controlling to control the current flow from the first terminal to the second terminal and to control the gain of the amplifying means,
means coupling the bandpass filter output to the first terminal, said variable control voltage means when changed in a first direction decreases the resistance from the first terminal to the second terminal of the amplifying means to increasingly load the bandpass filter narrowing the bandpass characteristic of the amplifying means to increase the amplitude of the filter output in proportion to the amount the filter is loaded, said variable control voltage means when changed in a second direction increasing the resistance from the first terminal to the second terminal of the amplifying means to decreasingly load the bandpass filter widening the bandpass characteristic of the bandpass filter and decreasing the gain of the amplifying means to decrease the amplification of the filter output in proportion to the amount the filter is loaded, and
means for additively combining the outputs from the first terminal and the second terminal.

15. A variable-bandwidth, constant-amplitude bandpass filter arrangement comprising
a bandpass filter having an input and an output,
means for introducing signals into said filter input,
an electronic tube having at least three electrodes including a cathode,
a grid, and
a plate,
parallel tuned circuit means resonant in the bandpass frequency range of the filter coupling the cathode to ground,
means including a load resistor coupling the plate to ground,
variable bias control voltage means coupled to the grid,
means coupling the filter output to the cathode, said variable bias control voltage means when changed in a first direction decreasing the resistance from the cathode to the plate of the electronic tube to increasingly load the bandpass filter narrowing the bandpass characteristic of the bandpass filter and increasing the gain of the electronic tube to increase the amplitude of the filter output in proportion to the amount the filter is loaded, said variable bias control voltage means when changed in a second direction increasing the resistance from the cathode to the plate of the electronic tube to decreasingly load the bandpass filter widening the bandpass characteristic of the bandpass filter and decreasing the gain of the electronic tube to decrease the amplitude of the filter output in proportion to the amount the filter is loaded, and
means for additively combining the outputs from the cathode and the plate of the electronic tube.

16. A variable-bandwidth, constant-amplitude bandpass filter arrangement comprising
a bandpass filter having an input and an output,
means for introducing signals into said filter input,
a transistor having an emitter electrode,
a base electrode, and
a collector electrode,
means resonant in the bandpass frequency range of the filter coupling the emitter to ground,
means including a load resistor coupling the collector to ground,
variable bias control voltage means coupled to the base,
means coupling the filter output to the emitter, said variable bias control voltage means when changed in a first direction decreasing the resistance from the emitter to the collector of the transistor to increasingly load the bandpass filter narrowing the bandpass characteristic of the bandpass filter and increasing the gain of the transistor to increase the amplification of the filter output in proportion to the amount the filter is loaded, said variable bias control voltage means when changed in a second direction increasing the resistance from the emitter to the collector of the transistor to decreasingly load the bandpass filter widening the bandpass characteristic of the bandpass filter and decreasing the gain of the transistor to decrease the amplification of the filter output in proportion to the amount the filter is loaded, and
means for additively combining the outputs from the emitter and the collector of the transistor.

17. A variable-bandwidth, constant-amplitude bandpass filter arrangement comprising
a bandpass filter having an input and an output,
means for introducing signals into said filter input,
amplifier means having a first terminal and a second terminal,
means for controlling the current flow from the first terminal to the second terminal,
parallel tuned circuit means resonant in the bandpass frequency range of the filter coupling the first terminal to ground.

means including a load resistor coupling the second terminal to ground,
variable control voltage means coupled to said means for controlling to control the current flow from the first terminal to the second terminal and to control the gain of the amplifying means,
means coupling the bandpass filter output to the first terminal, said variable control voltage means when changed in a first direction decreasing the resistance from the first terminal to the second terminal of the amplifying means to increasingly load the bandpass filter narrowing the bandpass characteristic of the bandpass filter and increasing the gain of the amplifying means to increase the amplification of the filter output in proportion to the amount of the filter is loaded, said variable control voltage means when charged in a second direction increasing the resistance from the first terminal to the second terminal of the amplifying means to decreasingly load the bandpass filter widening the bandpass characteristic of the bandpass filter and decreasing the amplification factor of the amplifying means to decrease the amplification of the filter output in proportion to the amount of the filter is loaded,
a summing junction,
first summing resistance means coupling the second terminal to the summing junction,
second summing resistor means coupling the first terminal to the summing junction, whereby the output of the filter remains constant regardless of the amount of loading of the filter.

18. A variable-bandwidth, constant-amplitude bandpass filter arrangement comprising
a bandpass filter having an input and an output,
means for introducing signals into said filter input,
a transistor having an emitter electrode,
a base electrode, and
a collector electrode,
means resonant at the bandpass frequency of the filter coupling the emitter to ground,
means including a load resistor coupling the collector to ground,
variable bias means coupled to the base,
means coupling the filter output to the emitter,
a summing junction,
first summing resistor means coupling the collector to the summing junction,
transistor means having a high input impedance and a low output impedance,
second summing resistor means in series with the means having a high input impedance and a low output impedance coupling the emitter to the summing junction, whereby varying the base bias controls the conductance of the transistor and the gain of the transistor.

References Cited

UNITED STATES PATENTS

| | | | |
|---|---|---|---|
| 3,160,827 | 12/1964 | Chute | 330—193 X |
| 3,164,780 | 1/1965 | Ranky | 330—186 X |

ROY LAKE, *Primary Examiner.*

J. B. MULLINS, *Assistant Examiner.*